United States Patent Office 3,832,172
Patented Aug. 27, 1974

3,832,172
PHOTOSENSITIVE MATERIAL FOR
ELECTROPHOTOGRAPHY
Katsuhiko Nishide, Yokohama, Teruo Yamanouchi, Fujisawa, and Kikuo Kinjo, Tokyo, Japan, assignors to Canon Kabushiki Kaisha, Tokyo, Japan
Filed Dec. 27, 1972, Ser. No. 318,886
Int. Cl. G03g 5/06
U.S. Cl. 96—1.6                                         3 Claims

ABSTRACT OF THE DISCLOSURE

A photosensitive material for electrophotography comprises an organic photoconductive material and a diarylmethane type coloring matter having the formula

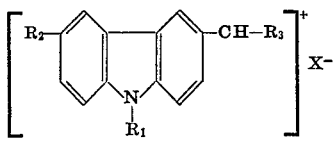

wherein $R_1$ is a member selected from the group consisting of hydrogen, alkyl, aralkyl, aryl, acyl and substituted aryl having, as the substituent, a member selected from the group consisting of alkyl, alkoxyl, dialkylamino, nitro and halo; $R_2$ is a member selected from the group consisting of hydrogen, hydroxy, alkyl, aroyl, alkoxyl, amino, substituted amino, nitro, halo, aryloxy, acyl aryl, and cyano; $R_3$ is selected from the group consisting of carbazolyl, substituted carbazolyl, p-anilinophenyl and substituted p-anilinophenyl; and $X^-$ is an inorganic or organic anion.

BACKGROUND OF THE INVENTION

Field of the Invention

This invention relates to a novel photosensitive material for electrophotography using a diarylmethane type coloring matter having a carbazole ring as a sensitizing coloring matter.

Description of Prior Art

Many kinds of inorganic or organic photoconductive materials are known as a photosensitive material for electrophotography. The inorganic photoconductive material such as zinc oxide, selenium, selenium-tellurium alloy or sulfides of selenium and cadmium, the low molecular type organic photoconductive materials such as acylhydrazone derivatives, oxadiazole derivatives, pyrazolyl derivatives, imidazolone derivatives, imidazothione derivatives, benzoxazole derivatives, benzoimidazole derivatives or benzothiazole derivatives, polymers having a heterocyclic ring such as carbazole ring disclosed in Japanese Patent Publication No. 10966/1959, No. 812/1961, No. 18674/1967, No. 25230/1967 and the like, polymers having a polycyclic aromatic ring such as a naphthalene ring or an anthracene ring and the like are known. Said photoconductive materials are usually dispersed or dissolved into a natural or synthetic resin as a binder and, if desired, applied to a support together with other additives to produce a photosensitive plate. Most of inorganic and organic photoconductive members have disadvantageously no sensitivity for light of visible wave length.

Dye sensitization is known as a method improving these drawbacks.

There have been many researches on sensitizing inorganic photoconductive members such as zinc oxide and the like by a coloring matter, but only few researches on sensitizing organic photoconductive members by a coloring matter and any coloring matter capable of sufficiently sensitizing organic photoconductive members has not yet been found.

In addition, conventional sensitizing coloring matters have dark color and tends to colorize a photosensitive member to a great extent resulting in deteriorating appearance.

SUMMARY OF THE INVENTION

According to the present invention, there is provided a photosensitive material for electrophotography which comprises an organic photoconductive material and a diarylmethane type coloring matter having the formula

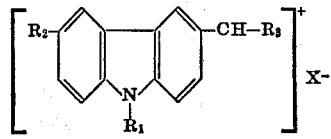

wherein $R_1$ is a member selected from the group consisting of hydrogen, alkyl, aralkyl, aryl, acyl and substituted aryl having, as the substituent, a member selected from the group consisting of alkyl, alkoxyl, dialkylamino, nitro and halo; $R_2$ is a member selected from the group consisting of hydrogen, hydroxy, alkyl, aroyl, alkoxyl, amino, substituted amino, nitro, halo, aryloxy, acyl aryl, and cyano; $R_3$ is selected from the group consisting of carbazolyl, substituted carbazolyl, p-anilinophenyl and substituted p-anilinophenyl; and $X^-$ is an inorganic or organic anion.

An object of this invention is to provide a sensitizing coloring matter which is especially useful for sensitizing an organic photoconductive material.

Another object of this invention is to provide a sensitizing coloring matter having light color and high sensitizing effect.

Further object of this invention is to provide a photosensitive material capable of effecting sensitization over the almost all visible light region.

Still further object of this invention is to provide a stable and highly sensitized photosensitive material.

The present invention is relevant to improvement in the sensitizing coloring matter disclosed in U.S. Ser. No. 99,128 filed Dec. 17, 1970, and gives a high sensitization effect, high stability and improved fading property.

DESCRIPTION OF THE PREFERRED EMBODIMENTS

Figure 1:
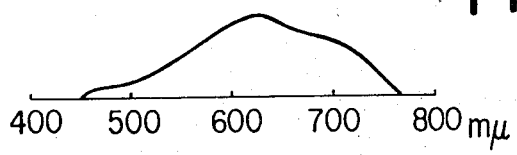
FIG. 1–FIG. 4 are curves of spectral sensitivity of the photosensitive members used for electrophotography using a diarylmethane dye according to the present invention.
Figure 2:
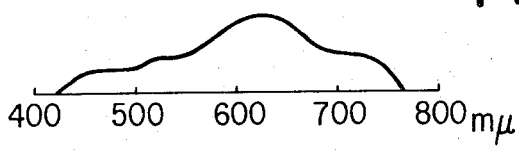
Figure 3:
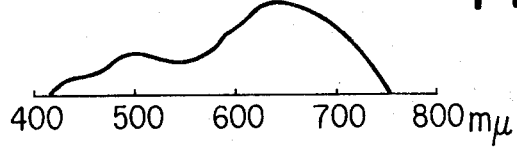

The sensitizing coloring matter has a chemical structure represented by the formula

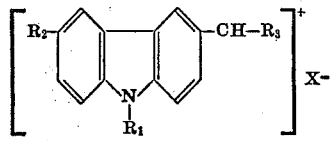

wherein $R_1$ is a member selected from the group consisting of hydrogen, alkyl, aralkyl, aryl, acyl and substituted aryl having, as the substituent, a member selected from the group consisting of alkyl, alkoxyl, dialkylamino, nitro and halo; $R_2$ is a member selected from the group consisting of hydrogen, hydroxy, alkyl, aroyl, alkoxyl, amino, substituted amino, nitro, halo, aryloxy, acyl aryl, and cyano; $R_3$ is selected from the group consisting of carbazolyl, substituted carbazolyl, p-anilinophenyl and substituted p-anilinophenyl; and X⁻ is an inorganic or organic anion.

The substituent of substituted carbazolyl group and substituted p-anilinophenyl in R₃ may be usually selected from the group consisting of alkyl, alkoxyl, dialkylamino, phenyl, nitro, halo and the like. Representative inorganic and organic anions in X⁻ are Cl⁻, Br⁻, I⁻, ClO₄⁻ IO₄⁻, BF₄⁻, SbCl₆⁻, and CH₃—C₆H₄—SO₃⁻.

The representative examples of the sensitizing coloring matter are as follows:

1. 9,9'-diethyl-3,3'-dicarbazolylmethyl perchlorate

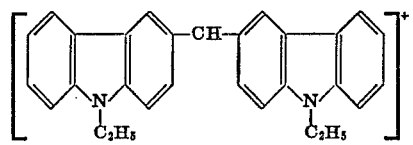

2. 6,6'-dichloro - 9,9' - diethyl-3,3'-dicarbazolylmethyl perchlorate

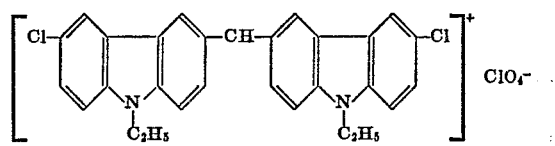

3. 6,6' - dibromo-9,9'-diethyl-3,3'-dicarbazolylmethyl perchlorate

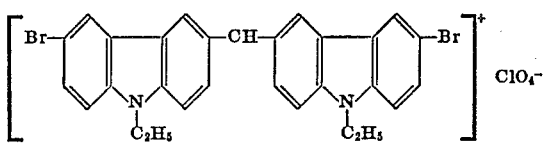

4. 6,6' - diiodo-9,9'-diethyl-3,3'-dicarbazolylmethyl perchlorate

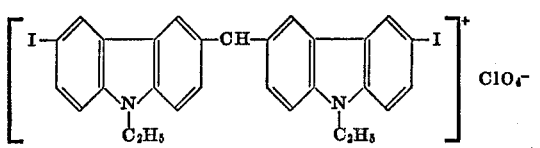

5. 6,6' - dimethyl - 9,9'-diethyl-3,3'-dicarbazolylmethyl hexachlorantimonate

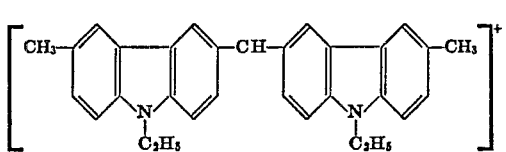

6. 6,6' - dimethoxy - 9,9' - dimethyl-3,3'-dicarbazolylmethyl perchlorate

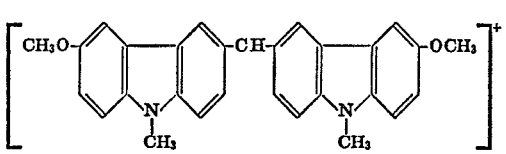

7. 6,6' - dimethylamino - 9,9'-diisopropyl-3,3'-dicarbazolylmethyl chloride

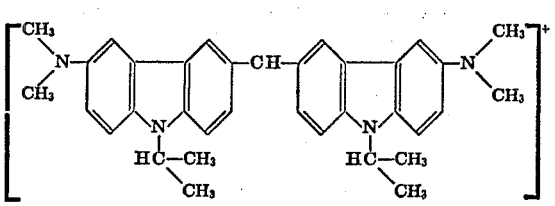

8. 6,6' - dimethyl-9,9'-di-p-chlorophenyl-3,3'-dicarbazolylmethyl fluoroborate

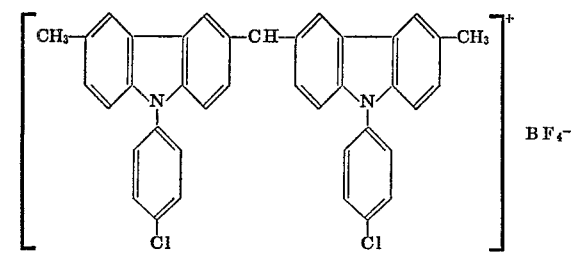

9. 6 - methyl - 6'-chloro-9,9'-diethyl-3,3'-dicarbazolylmethyl fluoroborate

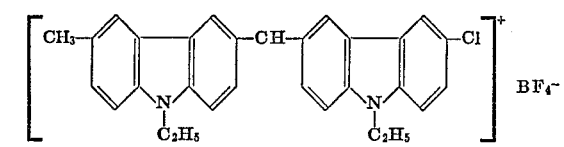

10. 6,9,9' - triethyl-6'-dimethylamino-3,3'-dicarbazolylmethyl bromide

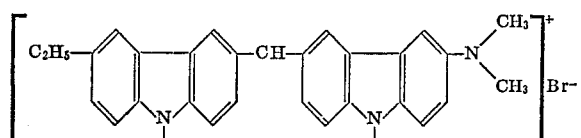

11. 6 - methyl-6'-methoxy-9-p-methoxyphenyl-9'-n-butyl-3,3'-dicarbazolylmethyl hexachlorantimonate

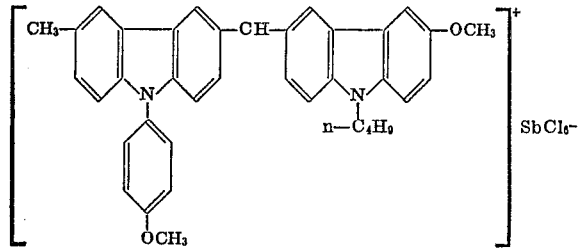

12. 6 - nitro-6'-diethylamino-9,9'-diethyl-3,3'-dicarbazolylmethyl periodate

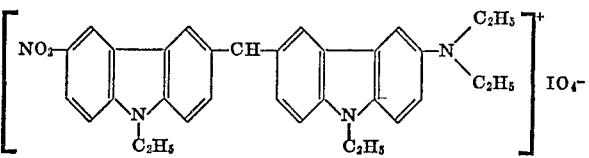

13. 6 - ethoxy-6'-dimethylamino-9,9'-diethyl-3,3'-dicarbazolylmethyl tosylate

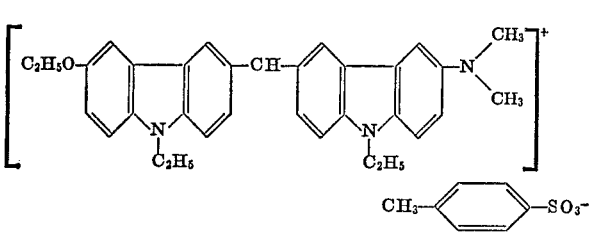

14. (6 - chloro-9-ethyl-3-carbazolyl)-p-(N-ethyl-N-p-tolylamino) phenylmethyl perchlorate

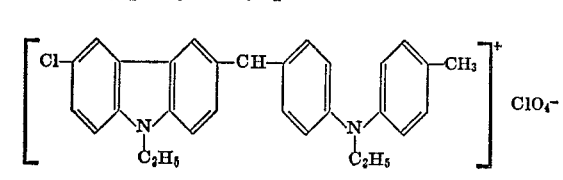

15. (6 - bromo-9-methyl-3-carbazolyl)-p-(N-methyl-N-p-bromophenylamino) phenylmethyl fluoroborate

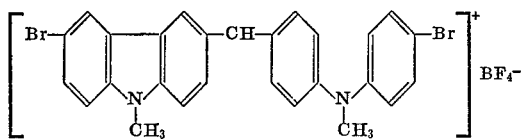

16. (9 - methyl-3-carbazolyl)-p-(N-methyl-N-phenylamino) phenylmethyl perchlorate

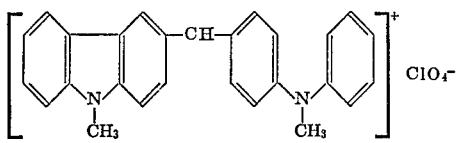

17. (9 - ethyl-3-carbazolyl)-p-(N-phenyl-N-p-dimethylamino-phenylamino) phenylmethyl periodate

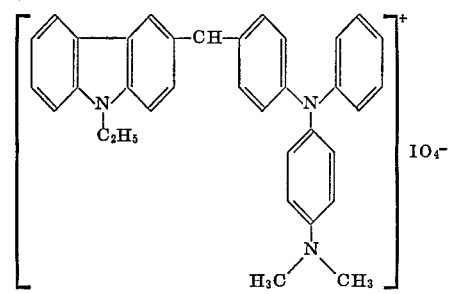

18. 6,6' - diiodo - 9'-ethyl-3,3'-dicarbazolylmethyl perchlorate

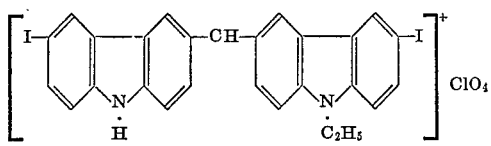

19. 6,6' - dimethyl-9-benzyl-9'-ethyl-3,3'-dicarbazolylmethyl hexachlorantimonate

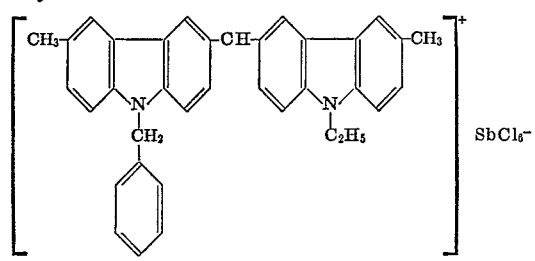

20. 6,6' - dimethoxy - 9-phenyl-9'-methyl-3,3'-dicarbazolylmethyl perchlorate

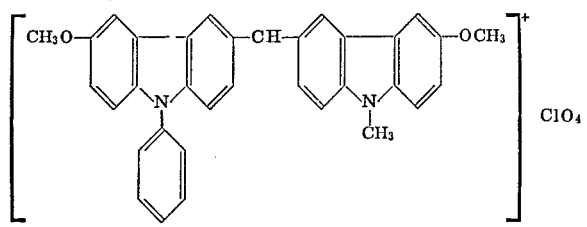

21. 6,6' - dimethylamino-9-acetyl-9'-isopropyl-3,3'-dicarbazolylmethyl chloride

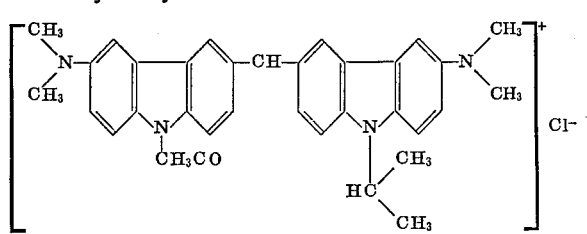

22. 6 - hydroxy - 6'-diethylamino-9,9'-diethyl-3,3'-dicarbazolylmethyl periodate

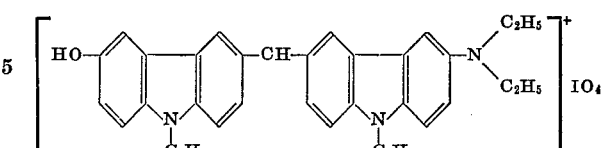

23. 6 - benzoyl - 6'-dimethylamino-9,9'-diethyl-3,3'-dicarbazolylmethyl tosylate

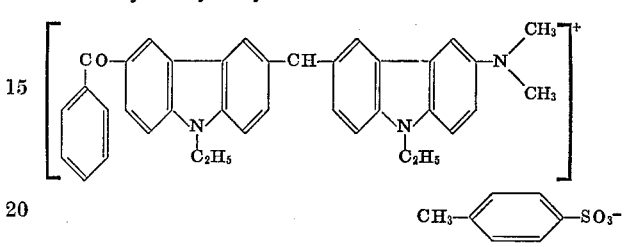

24. (6 - cyano - 9-ethyl-3-carbazolyl)-p-(N-ethyl-N-p-tolylamino) phenylmethyl perchlorate

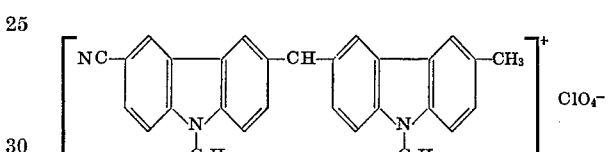

25. 6 - p-tolyloxy-6'-diethylamino-9,9'-diethyl-3,3'-dicarbazolylmethyl periodate

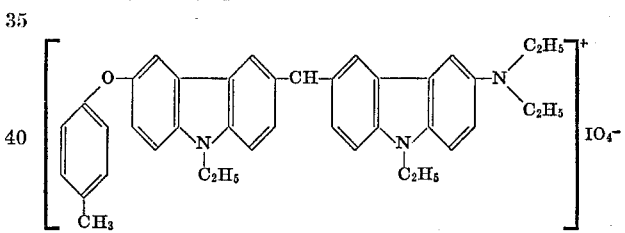

Representative synthetic methods for the above mentioned compounds are shown below.

SYNTHESIZING EXAMPLE 1

6,6'-dichloro-9,9'-diethyl-3,3'-dicarbazolylmethyl perchlorate (the illustrative compound 2 above)

11.49 g. (0.05 mole) of 3-chloro-9-ethyl-carbazole was dissolved in 50 cc. of glacial acetic acid, and 1 cc. of concentrated sulfuric acid was added. The solution containing 2.05 cc. of 37% formalin (HCHO:0.28 mole) in 5 cc. of glacial acetic acid was added at one time to said solution with stirring at 85° C. Said solution was cooled after stirring for ten minutes, and filtrated to separate a precipitate. Said precipitate was dissolved in carbon tetrachloride and the insoluble matter were removed and dried to recrystallize the residue from benzene. The obtained white needles were 6,6'-dichloro-9,9'-diethyl-3,3'-dicarbazolylmethane. Its melting point was 187–189° C., and the yield was 4.8 g. or 40.7%. (Analysis, found: C 73.95%; H 5.34%; N 5.68%; calculated from $C_{29}H_{24}N_2Cl_2$: C 73.89%; H 5.13%; N 5.94%)

4.71 g. (0.01 mole) of the above compound was dissolved in 50 cc. of 1,2-dichloroethane, and the solution of 3.43 g. (0.01 mole) of triphenylmethyl perchlorate in 50 cc. of 1,2-dichloroethane was added gradually with stirring. After standing over night, this solution was poured into 50 cc. of petroleum ether to obtain the end product as dark violet blue precipitate. Said product was refined by dissolving said product in 1,2-dichloroethane and pouring in petroleum ether to reprecipitate (yield was 5.8 g.).

SYNTHESIZING EXAMPLE 2

9,9'-diethyl-3,3'-dicarbazolylmethyl perchlorate (the illustrative compound 1 above)

6,6' - diiodo-9,9'-diethyl-3,3'-dicarbazolylmethane was obtained from 16.06 g. (0.05 mole) of 3-iodo-9-ethyl-carbazole by the same procedure as Synthesizing Example 1. The melting point was 203-204° C., and the yield was 6.2 g. or 37.9%. (Analysis, found: C 53.50%; H 3.84%; N 4.20%; calculated from $C_{29}H_{24}N_2I_2$:C 53.23%; H 3.70%; N 4.28%).

3.27 g. (0.005 mole) of the said compound was dissolved in 50 cc. of tetrahydrofuran containing 1 g. of lithium alminum hydride and refluxed for 24 hours, to which ethyl acetate was added to decompose excess lithium alminum hydride and 100 cc. of benzene was added, and washed with 2N HCl. The organic layer was separated, washed with water and evaporated to dryness. The residue was recrystallized from ether to obtain the white needle crystal of 9,9' - diethyl-3,3'-dicarbazolylmethane. The melting point was 142-143° C. and the yield was 1.2 g. or 59.6%. (Analysis, found: C 86.61%; H 6.42%; N 6.84%; calculated from $C_{29}H_{26}N_2$: C 86.53%; H 6.51%; N 6.96%). Thereafter, the end product was obtained by treating with triphenylmethyl perchlorate by the same procedure as that of Synthesizing Example 1.

SYNTHESIZING EXAMPLE 3

6 - methyl - 6'-chloro-9,9'-diethyl-3,3'-dicarbazolylmethyl fluoroborate (the illustrative compound 9 above)

2.09 g. (0.01 mole) of 3-methyl-9-ethylcarbazole and 2.60 g. (0.01 mole) of 3-chloro-6-hydroxymethyl-9-ethylcarbazole were dissolved in 60 cc. of acetic acid, to which 0.2 cc. of concentrated sulfuric acid was added and refluxed for 5 minutes. The resulting solution was cooled and poured into water to obtain a precipitate. Said precipitate was recrystallized from benzene to obtain 6-methyl-6' - chloro-9,9'-diethyl-3,3'-dicarbazolylmethane (melting point, 176-178° C.) and its yield was 1.2 g. or 26.6%. (Analysis, found: C 80.07%; H 6.28%; N 6.11%; calculated from $C_{30}H_{27}N_2Cl$: C 79.89%; H 6.02%; N 6.21%). The resulting product was treated with equimolar triphenylmethyl fluoroborate by the same procedure as that of Synthesizing Example 1 to obtain the end product.

SYNTHESIZING EXAMPLE 4

(6 - chloro - 9 -ethyl-3-carbazolyl)-p-(N-ethyl-N-tolyl-amino) phenylmethyl perchlorate (the illustrative compound 14 above)

2.60 g. (0.01 mole) of 3-chloro-6-hydroxymethyl-9-ethylcarbazole and 2.11 g. (0.01 mole) of 4-methyl-N-ethyldiphenylamine were reacted by the same procedure as that of Synthesizing Example 3 to obtain (6-chloro-9-ethyl - 3-carbazolyl)-p-(N-ethyl-N-p-tolylamino) phenylmethane (melting point, 152-154° C.) and the yield was 1.3 g. or 28.7%. (Analysis, found: C 79.78%; H 6.38%; N 5.95%; calculated from $C_{30}H_{29}N_2Cl$: C 79.54%; H 6.45%; N 6.18%). The resulting product was treated with equimolar triphenylmethyl perchlorate by the same procedure as that of Synthesizing Example 1 to obtain the end product.

The photosensitive material of this invention was produced by dissolving or dispersing the carbazolemethane type sensitizing coloring matter as obtained above, a photoconductive material and, if desired, a binder resin and other additives in a solvent and coated on a support, and in a special case, may be produced in a form of self-supporting product.

The above mentioned sensitizing coloring matters may be combined with the well known sensitizing coloring matters or chemical sensitizers such as Lewis acid to obtain highly sensitive photosensitive materials.

For the purpose of making a photosensitive film or paper, the above mentioned sensitizing coloring matters are usually added to a photoconductive material preferably in an amount of 0.01–10% by weight based on the photoconductive material in a form of a solution, for example, in a small amount of an organic solvent such as chloroform, methylene chloride, or 1,2-dichloroethane. Further when used for an electrophotographic process comprising image transferring as a durable photosensitive plate, the amount of coloring matter is usually up to 20%, preferred with 0.5–10%, based on the photoconductive material.

The carbazolylmethane type coloring matter of this invention provides sensitizing portions in a wide range of a visible spectrum region, especially in the range of 450 to 700 millimicrons. The wave length at peak of sensitizing is in the range of about 530 to 650 millimicrons depending upon selection of compounds, and said range is useful for orthochromatic and panchromatic electrophotography.

The well known organic photoconductive materials may be used as organic photoconductive materials in this invention.

Representative materials used as an organic photoconductive material in the present invention are as follows:

(A) Polymer having a carbazole ring such as poly-9-vinylcarbazole, 9-vinylcarbazole copolymer, 3-nitro-9-vinylcarbazole copolymer, 3-methylamino-9-vinylcarbazole copolymer, nitrated poly-9-vinylcarbazole, 3,6-dibromo-9-vinylcarbazole copolymer, poly-9-vinyl-3-aminocarbazole, chlorinated poly-9-vinylcarbazole, thiocyanated poly-9-vinylcarbazole, cyanated poly-9-vinylcarbazole, brominated poly - 9 - vinylcarbazole, 3-iodo-9-vinylcarbazole copolymer, poly-3,6-diiodo-9-vinylcarbazole, poly-3-benzylideneamino-9-vinylcarbazole, 3,6-dibromo-9-vinylcarbazole copolymer, $\alpha,\omega$ - bis-carbazole-alkane derivative, vinyl anthracene·9-vinylcarbazole copolymer, (2 or 3)-vinyl-9-alkyl-carbazole polymer or copolymer (the alkyl group is selected from the group consisting of primary alkyls such as methyl, ethyl and propyl).

(B) Aromatic amino derivatives such as aminopolyphenyl, (allylidene)azines, N-N'-dialkyl-N,N'-dibenzylphenylenediamine, N,N,N',N'-tetrabenzylphenylenediamine, N,N'-diphenyl-p-phenylenediamine, N,N'-dinaphthyl-p-phenylenediamine, 4,4' - bisdimethylaminophendiphenone.

(C) Diphenylmethanes and triphenylmethanes such as diphenylmethane dye leuco base and triphenylmethane dye leuco base.

(D) Heterocyclic compounds such as oxadiazole, 5-aminothiazole, 4,1,2-triazole, imidazolone, oxazole, imidazole, pyrazoline, imidazoline, polyphenylenethiazole, 1,6-methoxyphenazine, pyrazolinopyrazoline derivatives and the like.

(E) Compounds having a condensed ring such as benzothiazole, benzimidazole, and benzoxazole, for example, 2-(4'-diaminophenyl)-benzoxazole and 2-(4'-dimethylaminophenyl) benzoxazole, aminoacridine, quinoxaline, diphenylenehydrazones, pyrrocoline derivatives, 9,10-dihydroanthracene derivatives and the like.

(F) Compounds having a double bond such as acylhydrazone, ethylene derivatives, 1,1,6,6-tetraphenylhexatriene, and the like.

(G) Condensation products such as condensation products of aldehydes and aromatic amines, reaction product of secondary aromatic amines and aromatic halides, polypyromethano - imido-poly-p-phenylene-1,3,4-oxadiazole and the like.

(H) Vinyl polymers (except polyvinylcarbazole) such as α-alkylacrylic acid, amide polymers, polyvinylacridine, poly - [1,5 - diphenyl-3-(4-vinylphenyl)-2-pyrazoline], poly-(1,5-diphenylpyrazoline), polyacenaphthylene, nuclear substituted polyacenaphthylene, polyvinylanthracene, poly-2-vinyldibenzothiophene and the like.

Materials providing good results of sensitizing treatment of this invention among these organic photoconductive materials are polymers having a carbazole ring and their derivatives, aromatic amino derivatives, diphenylmethane derivatives and triphenylmethane derivatives.

The diarylmethane type coloring matter has a diarylmethane structure having a carbazole group as aryl group and it is considered that this structure causes the high sensitizing action. The sensitizing coloring matters of this invention are more or less different from each other with respect to sensitizing effect, but show almost similar high sensitizing. The most useful diarylmethane compounds are dicarbazolylmethane type coloring matters in which two aryl groups are substituted by carbazolyl group.

EXAMPLE 1

Two grams of poly-9-vinylcarbazole was dissolved in 35 cc. of benzene and mixed with a solution of 17.1 mg. of 6,6' - dichloro - 9,9' - diethyl-3,3'-dicarbazolylmethylperchlorate (the illustrative compound 2) in 5 cc. of chloroform. An art paper was coated with the resulting solution and dried to obtain a photosensitive paper having a photosensitive layer of thickness of 8 microns.

After the photosensitive paper was charged, a positive image on a photographic plate was contacted with the charged photosensitive paper, exposed to light of 100 lux by a photographic enlarger and developed to obtain a good image. The proper exposure was 200 lux.sec. The curve of spectral sensitivity was as shown in FIG. 1.

EXAMPLE 2

Two grams of chlorinated poly-9-vinylcarbazole (chlorine content: 8.5%) and 0.5 g. of diphenyl chloride were dissolved in 35 cc. of methylene chloride. The resulting solution was added to the solution containing a sensitizing coloring matter of this invention dissolved in 5 cc. of chloroform, and an art paper was coated with the solution and dried to obtain a photosensitive paper having a photosensitive layer of thickness of 8 microns. The resulting photosensitive paper was charged, exposed and developed by the same procedure as that of Example 1 to obtain a clear image of high fidelity. Optimum exposure (lux.sec.) varied depending upon the type of sensitizing coloring matter as shown below.

| | Amount (mg.) | Optimum exposure (lux. sec.) |
|---|---|---|
| Number of illustrative sensitizing coloring matter: | | |
| 1 | 15.0 | 200 |
| 2 | 17.1 | 180 |
| 3 | 19.8 | 150 |
| 4 | 22.6 | 120 |
| 5 | 22.9 | 220 |
| Crystal Violet | 12.2 | 850 |
| Rhodamine B | 14.4 | 800 |
| Malachite Green | 10.9 | 900 |

NOTE.—Crystal Violet, Rhodamine B and Malachite Green are conventional sensitizing coloring matters.

Spectral sensitivities of photosensitive papers containing illustrative coloring matters 4 and 5, Crystal Violet and Rhodamine B in the present Example are shown in FIG. 2, FIG. 3, FIG. 5 and FIG. 6, respectively.

EXAMPLE 3

A photosensitive paper was produced by the same procedure as that of Example 2 except that 2 g. of thiocyanated poly-9-vinylcarbazole (sulfur content: 3.67%) in place of the chlorinated poly-9-vinylcarbazole, charged, exposed and developed to obtain a clear reproduced image. The coloring matter of this invention used in Example 3 were Nos. 6, 7, 8 and 9 and the optimum exposure (lux. sec.) necessary to obtain a clear reproduced image were as follows.

| No. of illustrative coloring matter | Amount (mg.) | Optimum exposure amount (lux. sec.) |
|---|---|---|
| 6 | 16.0 | 220 |
| 7 | 16.5 | 250 |
| 8 | 20.4 | 180 |
| 9 | 16.1 | 180 |

Figure 4:
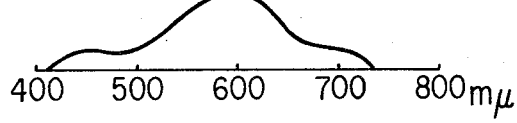
Figure 5:
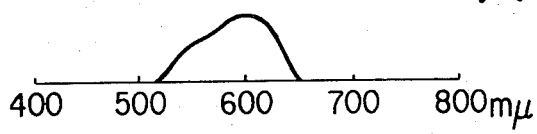
FIG. 5 and FIG. 6 are curves of spectral sensitivity when conventional sensitizing coloring matters are used.
Figure 6:
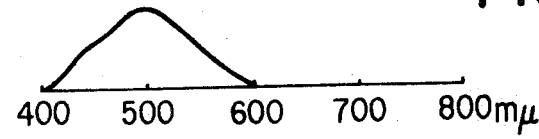

The curve of spectral sensitivity of the photosensitive paper in the case of using coloring matter other than No. 6 was as shown in FIG. 4.

EXAMPLE 4

Two grams of cyanated poly-9-vinylcarbazole (nitrogen content: 8.76%) and 1 g. of poly-α-methylstyrene (trade name: Resin 276–V9, supplied by Dow Chemical Corp.) were dissolved in 35 cc. of chlorobenzene, and mixed with a solution of 26.6 mg. of 6-methyl-6'-methoxy-9-p-methoxyphenyl-9'-n-butyl-3,3' - carbazolylmethylhexachlorantimonate (an illustrative coloring matter No. 11) in 5 cc. of methylene chloride to obtain a photosensitive solution. A transparent polyester film having a thin aluminium film vapor-deposited was coated with the resulting photosensitive solution, dried to obtain a transparent photosensitive film having a photosensitive layer of thickness of 5 microns. The photosensitive film thus produced was charged, exposed to light and developed to obtain a clear reproduced image. The optimum exposure was 240 lux.sec.

EXAMPLE 5

Two grams of 1,3,5-triphenylpyrazoline, 2 g. of polyvinylbutyral resin and 19.8 mg. of 6-ethoxy-6'-dimethylamino-9,9'-diethyl-3,3'-dicarbazolylmethyltosylate (illustrative coloring matter No. 13) were dissolved in 50 cc. of ethanol. An aluminium laminated paper was coated with said solution and dried to obtain a photosensitive paper having a layer of thickness of 6 microns. The resulting photosensitive paper was charged, exposed to light and developed by the same procedure as that of Example 1 to obtain a good image of high fidelity to the original. The optimum exposure was 650 lux.sec.

EXAMPLE 6

Two grams of N,N,N',N'-tetrabenzyl-m-phenylenediamine, 2 g. of polystyrene and 16.5 mg. of (6-chloro-9-ethyl - 3-carbazolyl)-p-(N-ethyl-N-p-tolylamino) phenylmethyl perchlorate (illustrative coloring matter No. 14) were dissolved in 40 cc. of methylene chloride. A paper treated to prevent permeation of solvents was coated with the solution as obtained above and dried to obtain a photosensitive paper having a photosensitive layer of thickness of about 7 microns. Said photosensitive paper was charged, exposed to light and developed by the same procedure as that of Example 1 to obtain a good image. The optimum exposure was 750 lux.sec.

EXAMPLE 7

Each of the following six sensitizing dyes was dissolved in chloroform to prepare a solution of concentration of $3.5 \times 10^{-5}$ mole. Each solution was exposed to white fluorescent lamp of 600 lux for one hour, and then, degree of lowering of dye density of each solution by fading of white light was measured by visible absorption spectrum ($\lambda_{max}$). The dye density after exposure was illustrated in column A of Table 1 below.

The result of measurement is expressed by taking the dye density before exposing to a white fluorescent lamp as 100.

In addition, six polyvinylcarbazole films containing 0.3 mole percent (i.e. 0.3 mole percent based on monomer unit of polyvinylcarbazole) of each of the following sensitizing coloring matters were prepared and allowed to stand under irradiation of a white fluorescent lamp for one hour and then the lowering of coloring matter density was determined by measuring the fading caused by the white light. The result is shown in column B and the result of measurement is expressed in a way similar to above.

TABLE 1

| Sensitizing coloring matter | A | B |
|---|---|---|
| Illustrative Compound 2 | 94.6 | 89.0 |
| Illustrative Compound 3 | 87.0 | 88.6 |
| Illustrative Compound 4 | 99.3 | 82.6 |
| Illustrative Compound 5 | 100.0 | 81.9 |
| 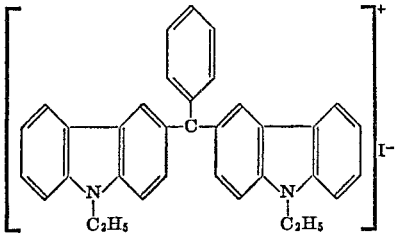 | 36.5 | 33.4 |
| 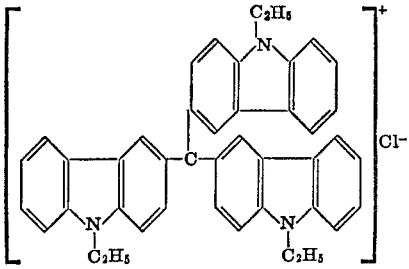 | 6.04 | 5.62 |

We claim:

1. A photosensitive material for electrophotography which comprises an organic photoconductive material and a diarylmethane type coloring matter having the formula

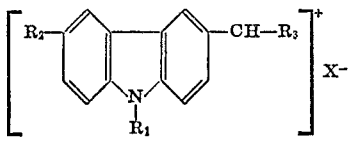

wherein $R_1$ is a member selected from the group consisting of hydrogen, alkyl, aralkyl, aryl, acyl and substituted aryl having, as the substituent, a member selected from the group consisting of alkyl, alkoxyl, dialkylamino, nitro and halo; $R_2$ is a member selected from the group consisting of hydrogen, hydroxy, alkyl, aroyl, alkoxyl, amino, substituted amino, nitro, halo, aryloxy, acyl aryl, and cyano; $R_3$ is selected from the group consisting of carbazolyl, substituted carbazolyl, p-anilinophenyl and substituted p-anilinophenyl; and $X^-$ is an inorganic or organic anion.

2. A photosensitive material for electrophotography according to Claim 1 in which the organic photoconductive material has a carbazole ring.

3. A photosensitive material for electrophotography according to Claim 1 in which the content of diarylmethane type coloring matter is 0.01–10 weight percent based on the amount of an organic photoconductive material.

References Cited

UNITED STATES PATENTS

| 3,647,433 | 3/1972 | Contois | 96—1.6 |
| 3,615,402 | 10/1971 | Rule | 96—1.6 |
| 3,647,432 | 3/1972 | Holstead | 96—1.6 |

RONALD H. SMITH, Primary Examiner

J. L. GOODROW, Assistant Examiner

U.S. Cl. X.R.

96—1.5

UNITED STATES PATENT OFFICE
CERTIFICATE OF CORRECTION

Patent No. 3832172          Dated August 27, 1974

Inventor(s) Katsuhiko Nishide, et al.

It is certified that error appears in the above-identified patent and that said Letters Patent are hereby corrected as shown below:

Column 1, line 8, insert --Claim priority, Application Japan, December 28, 1971, 3261/1972.--.

Column 7, line 13, "alminum" should read --aluminum--.

Column 9, line 31, "8.5%." should read --8.56%--.

Signed and sealed this 5th day of November 1974.

(SEAL)
Attest:

McCOY M. GIBSON JR.
Attesting Officer

C. MARSHALL DANN
Commissioner of Patents